J. M. JOHNSON.
TICKET AND COIN FARE BOX.
APPLICATION FILED MAY 28, 1914.
1,268,723.
Patented June 4, 1918.
4 SHEETS—SHEET 1.
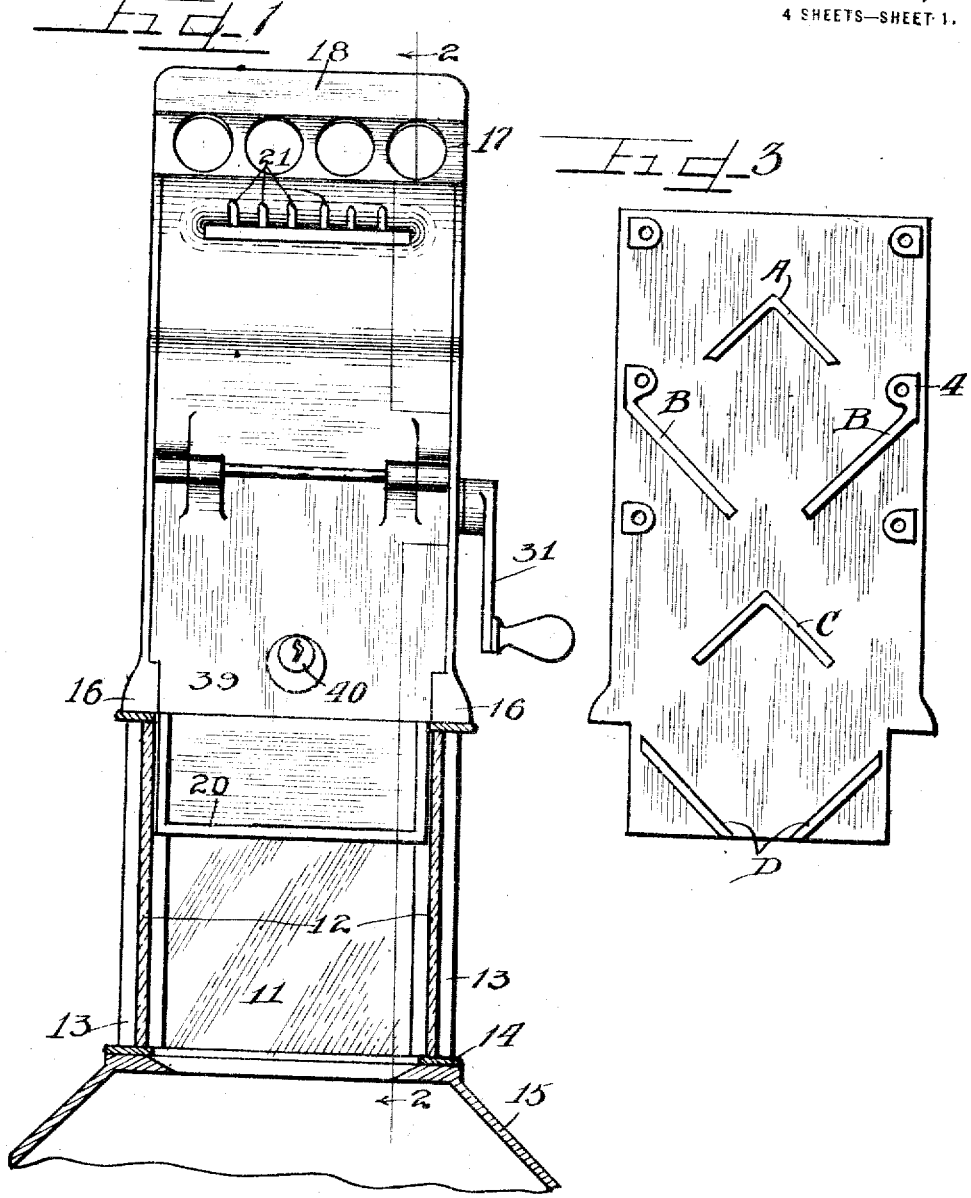

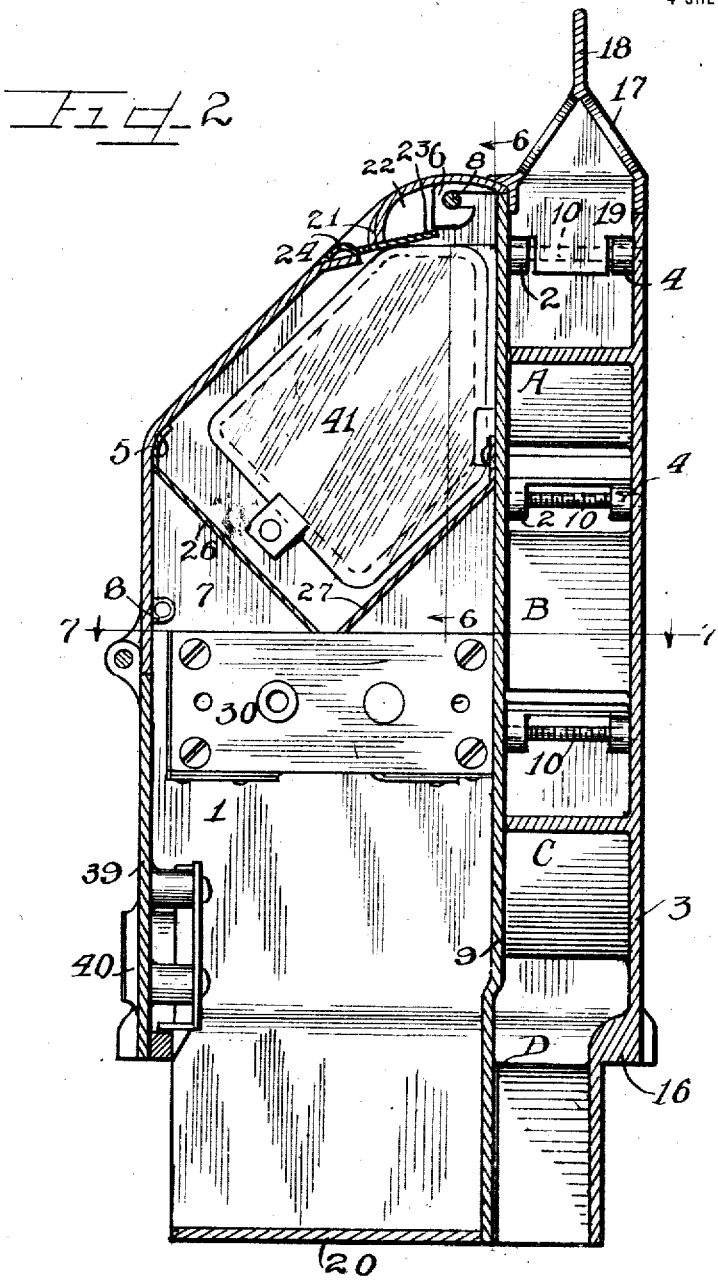

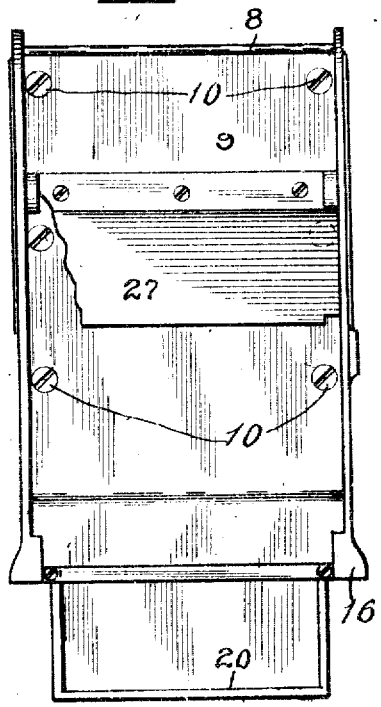
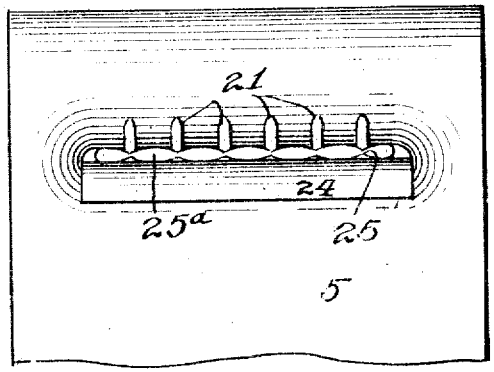
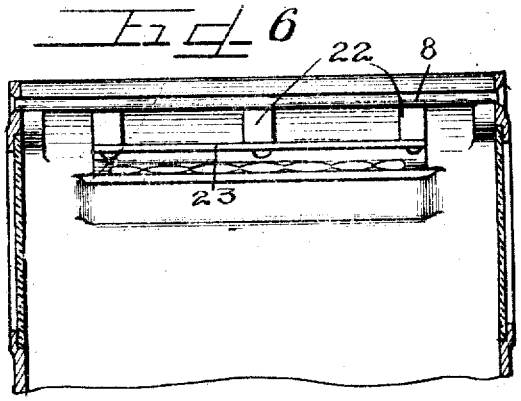

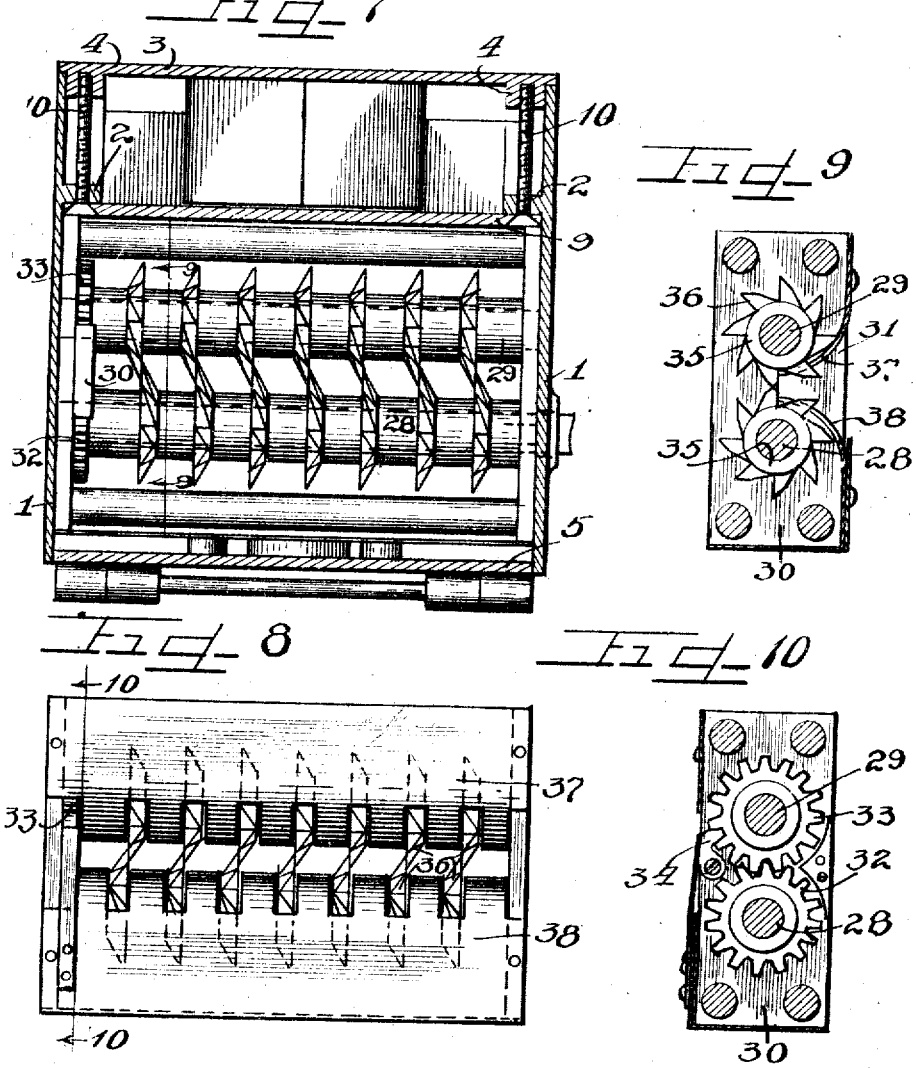

UNITED STATES PATENT OFFICE.

JAY M. JOHNSON, OF CHICAGO, ILLINOIS, ASSIGNOR TO WILLIAM P. BUTLER, OF BERWYN, ILLINOIS.

TICKET AND COIN FARE-BOX.

1,268,723.

Specification of Letters Patent.

Patented June 4, 1918.

Application filed May 28, 1914. Serial No. 841,685.

*To all whom it may concern:*

Be it known that I, JAY M. JOHNSON, a citizen of the United States, and a resident of the city of Chicago, county of Cook, and State of Illinois, have invented certain new and useful Improvements in Ticket and Coin Fare-Boxes; and I do hereby declare that the following is a full, clear, and exact description of the same, reference being had to the accompanying drawings, and to the numerals of reference marked thereon, which form a part of this specification.

It has become nearly general in practice for street railway companies and certain other transportation lines, and even places of amusement of certain kinds, to make use of collection boxes operated by the fare or ticket taker, and into which tickets and sometimes cash fares, are delivered indiscriminately mixed as the same are received. Usually, such boxes are mere receptacles to receive the fare or prepayment and it is possible, should the operator or anyone else have access to the tickets, to use the tickets again for payment of fare or admission. In some instances where tickets only are collected, a ticket chopper is used, which cuts up the tickets or destroys them beyond the possibility of use or even recognition and identification.

The object of this invention is to afford a fare box adapted to receive the prepayment coin and to deliver the same into an inspection box not accessible to the operator, and to afford in connection therewith a ticket receiving and canceling device in which the ticket is first exposed to inspection of the operator and the public, and then is roughly perforated to prevent re-use of the same, but to permit subsequent identification.

It is also an object of the invention to afford a combined coin and ticket fare register affording a separate inspection compartment for the coin and for the tickets, and embracing mutilating devices for the tickets capable of acting on said tickets only when the tickets are delivered from the inspection compartment.

It is an important object of the invention to afford a simple and efficient construction for the purpose intended, and from which it is impossible to withdraw either the coin or the ticket except by one possessed of the characteristic and special key or keys therefor.

The invention embraces many novel features and (in a preferred form) is illustrated in the drawings and hereinafter more fully described.

In the drawings:

Figure 1 is a front elevation, partly in section of a combined coin and ticket fare box embodying my invention.

Fig. 2 is an enlarged section on line 2—2 of Fig. 1.

Fig. 3 is a front face view of the back plate and inclined baffle plates affording a part of the coin chute.

Fig. 4 is a reduced front elevation of the ticket receiving portion of the fare box with the front plate removed.

Fig. 5 is an enlarged, fragmentary detail face view of the front plate for the ticket receptacle showing the ticket slot therein.

Fig. 6 is a fragmentary section on line 6—6 of Fig. 2.

Fig. 7 is a section taken on line 7—7 of Fig. 2, showing the mutilating devices in elevation.

Fig. 8 is a top plan view of the ticket mutilating devices, showing the same removed from the machine.

Fig. 9 is a section of the mutilating devices taken on line 9—9 of Fig. 7.

Fig. 10 is a similar section on line 10—10 of Fig. 8.

As shown in the drawings:

Separate and independent compartments are provided for the ticket and for the coin fare. These, however, are associated together in a single casing comprising side walls 1, provided intermediate their middle and their rear edges with corresponding or inwardly directed projections or ribs 2. The back-plate 3, of the casing (which also affords the back of the coin fare chute) is provided near each edge with projections 4, which fit between the rear edges of the side plates 1. The front plate 5, fits and is secured betwen the front edges of the side plates 1, being provided with lugs 6, at the top, and lugs 7, intermediate the top and bottom thereof, and through which and the side plates extend bolts 8, which rigidly secure the same in place. A plate 9, fits between the side walls and bears against the front faces of the lugs or ribs 2, and extending therethrough and screwing into the lugs or projections 4, are screw bolts 10, which serve to rigidly engage together the side walls of the back plates for the coin fare box and the back plate for the ticket fare box. Preferably the screw bolts 10, are arranged as illustrated in Fig. 7, so as to be inaccessible to the operator under ordinary conditions.

The back plate 9, for the ticket fare register forms the dividing wall between the coin and ticket sides of the box, and, as shown, inclined baffle plates integral with the back wall 3, extend across the space between the back wall 3, and the back wall 9, to afford a downwardly inclined and tortuous channel through which the coin descends to a lower inspection compartment indicated by 11. Said baffle plates, as shown, comprise an upper centrally disposed angular rib A, the ends of which incline from the center downwardly toward the sides of the back plate. Lateral baffle plates B, extend from the edges of the back plate inwardly and downwardly to near the middle of the plate. Central baffle plate C, corresponding in all respects with the baffle plate A, and arranged below the baffle plates B, and lateral downwardly and centrally disposed baffle plates D, disposed below the baffle plates C.

Said inspection compartment 11, comprises front, rear and side walls 12, of glass or other transparent medium arranged in a suitable supporting frame affording corner members 13, and a base plate 14, and which is adapted to be secured upon the top of a fare register 15, to discharge thereinto or upon any suitable base. Of course, if secured on the top of a fare register, as somewhat diagrammatically illustrated in Fig. 1, the usual dumping bottom for said inspection compartment is employed. This, however, is not illustrated in the drawings.

The side walls and rear wall of the fare box fit and extend down into the top of the coin inspection compartment, as illustrated in Fig. 1, and downwardly facing shoulders are provided on the walls of said fare box to rest upon the upper ends of the walls of the coin inspection compartment, as illustrated in Figs. 1 and 2. Preferably, knuckles 16, are provided at the corners coincident with said shoulders, and suitable screw bolts may be employed engaging in said knuckles to rigidly secure the fare box from removal from the coin inspection compartment.

Of course, as illustrated in Fig. 1, the coin chute opens directly at its lower end into the coin inspection compartment. Said coin chute also at its upper end is closed by a cap piece 17, affording downwardly inclined diverging walls having apertures therein to receive coin and extending upwardly from the apex of which is a web 18, upon which the word "Coins" is plainly marked to guide the depositor of the fare in depositing the same. Said cap piece 17, is rigidly engaged in place by means of side webs 19, which fit within and between the side walls of the casing, as shown in Fig. 2, and through the lower edges of which the bolts 10, engage, as shown in dotted lines in Fig. 2.

The ticket side of the fare box is closed at the bottom from the coin inspection compartment by a bottom wall 20. The front wall 5, of the casing inclines rearwardly near its upper end and is provided with a horizontal and downwardly directed ticket slot, as shown in Figs. 1, 2, and 5, and as shown, projecting integral ribs 21, are provided extending downwardly and partly into said ticket slot from above. Secured on the lugs 22, which may be integral with the front wall of the casing, is a downwardly and outwardly inclined plate 23, the outer edge 24, of which extends through the ticket slot in the outer wall of the casing, and is secured on said outer wall. Said plate 23, is provided with a ticket slot 25ª therethrough, and the metal at the lower edge of the slot is provided with teeth 25, which project into close proximity with the extremities of the ribs 21, thereby restricting the ticket slot, as shown more plainly in Fig. 5, to permit the insertion of a suitable ticket, but tending to prevent the insertion of any foreign object, even of a coin.

Within the upper end of the box, and secured respectively to the front plate 5, and to the back plate 9, are downwardly inclined converging plates 26 and 27, upon which the tickets fall when inserted into the machine, and from which the tickets slide to the mutilating devices positioned below the same. Said mutilating device comprises parallel shafts 28 and 29, journaled horizontally in a suitable frame 30, the end members of which are bolted to the side walls of the casing, so that said shafts lie parallel the opening between the inclined plates 26 and 27, before described, and below the same.

The shaft 28, extends through the side walls of the casing, and is provided with a crank 31, thereon for manual operation, as shown in Fig. 1. Intermeshing gears 32 and 33, are provided on the respective shafts, as shown in Fig. 10, whereby both shafts are driven simultaneously in opposite directions.

A spring pressed pawl 34, engages the gear wheel 33, and permits said shafts to rotate only inwardly and downwardly. A plurality of coacting cutters arranged in pairs on opposite shafts, act to draw the card inwardly and downwardly and to mutilate the same. These cutters are intended to leave the ticket substantially intact but to afford lines of large and rather irregular or rough perforations therein, mutilating the card beyond possible further use, but not mutilating it sufficiently to prevent ready identification.

These cutters comprise, as shown, star wheels, each of which comprises a collar 35, adapted to be secured on the respective shafts, each of said collars having a plurality of projecting cutting arms 36, one face of each of which is flat, and adapted to coact against a corresponding flat face on a corresponding arm of the adjacent star wheel, and the other face of which is inclined to the extremity of the arm affording a sharp perforating point at the extremity. Each of the arms has one radial cutting edge. The radial cutting edges of the corresponding cutter arms on corresponding star wheels coact as scissor points to easily perforate the ticket, and to withdraw with the further revolution of said shafts, as illustrated more plainly in Figs. 7, 8 and 9. Preferably, spring stripper fingers 37 and 38, are provided on the under side of the frame 31, and extend upwardly between the shafts before described, and act to strip the perforated ticket from the perforating arms as the ticket passes downwardly between the mutilating rolls. A door 39, affording a part of the front wall of the casing, is suitably hinged to the casing, and provided with a lock 40, to permit access to the compartment below the mutilating rolls for mutilated tickets.

As shown, the side walls of the casing are cut away in the upper ticket compartment (or that above the mutilating rolls) and plates 41, of glass or other transparent material are secured in the openings so formed to permit ready inspection of the tickets after the same have been deposited through the ticket slot.

The operation is as follows:

The coin fare is deposited by inserting the required coin through one of the apertures in the cap piece 17, at the top of the coin chute. The coin then falls and slides from the central inclined baffle plate A, to one of the baffle plates B, thence passing from one to the other of the baffle plates, and following a tortuous course, falls at last into the coin inspection compartment where it rests upon the dumping bottom of said compartment in a familiar manner.

The base upon which the fare box is supported, may or may not be a registering fare box. If, however, a registering fare box, as illustrated in Fig. 1, affords the base for the fare box, the contents of the inspection compartment are dumped directly into the fare register, for further operation or registering, which forms no part of this invention.

The tickets, when deposited, fall first into the upper or ticket inspection compartment, and the operator and the public can readily see if or not a valid ticket has been deposited upon glancing through the transparent side walls of said compartment. Of course, if preferred, a transparent section may be inserted in the front wall of said compartment, as well as through the side walls. Ordinarily, however, this is not deemed necessary.

The tickets, when deposited, slide down the inclined walls 26 and 27, until the lower edges thereof rest upon the intermeshing perforating and cutting arms of the mutilating devices. After the conductor has inspected the tickets in the upper compartment of the ticket fare box, the crank is turned, whereupon the tickets are drawn between the mutilating rolls by perforating and cutting arms, and delivered into the bottom or collection compartment, from whence they are removed at the end of the run by an operator or auditor provided with a suitable key, who, at the same time usually removes the cash fares from the machine.

Of course, it is understood that the mutilating devices may be variously constructed, and that details of construction in the arrangement of the coin and the ticket slots may be varied. It is desirable, however, to so construct the device as to preclude the delivery of coins or other foreign objects capable of injuring the perforating devices, through the ticket slot, and to prevent the delivery of tickets or other objects into the coin chute. It is to be understood that I have shown but one (and that a preferred) embodiment of my invention, and I therefore do not purpose limiting the patent otherwise than necessitated by the prior art.

I claim as my invention:

1. In a device of the class described, a casing having a ticket slot therein, coacting members for preventing the insertion of a coin through the ticket slot, a ticket inspection compartment below the slot converging to a discharge aperture and ticket cutting and mutilating rollers below the compartment positioned to have the tickets fall thereon through the aperture.

2. In a device of the class described, a casing having a ticket slot therein, coacting members for preventing the insertion of a coin through the ticket slot, a ticket inspection compartment below the slot converging to a discharge aperture, ticket cutting and mutilating rollers below the compartment positioned to have the tickets fall thereon through the aperture and spring stripper fingers for each roller and adapted to strip the tickets therefrom.

3. A device of the class described embracing a casing, a vertical partition therein affording on one side thereof a coin fare chute, and on the other side of the same a ticket inspection compartment, coacting mutilating devices one face of each of which is flat and adapted to contact against a corresponding flat face of the other device, said devices adapted to receive the ticket from said ticket-inspection compartment, a ticket collection compartment beneath the mutilating devices, a ticket slot in the front wall of said casing and means for preventing the insertion of coin or the like through the ticket slot.

4. In a device of the class described, a casing, a wall dividing the same forming a ticket and a coin compartment, a ticket slot in the wall of the casing opening into the ticket compartment, ribs on the casing projecting into the slot, means coacting with the ribs to prevent objects other than tickets from passing therethrough, mutilating devices comprising coacting revolving scissor pointed cutting arms and means for actuating the same to perforate the tickets.

5. In a device of the class described, a casing, a wall dividing the same forming a ticket and a coin compartment, a ticket slot in the wall of the casing opening into the ticket compartment, ribs on the casing projecting into the slot, means coacting with the ribs to prevent objects other than tickets from passing therethrough, mutilating devices comprising coacting revolving scissor pointed cutting arms, means for actuating the same to perforate the tickets, means for stripping the tickets from the cutting arms and a compartment for receiving the mutilated tickets.

6. In a device of the class described, a casing, a ticket slot therein, coacting ribs and teeth adapted to restrict the slot to passage of tickets therethrough and a cutting and perforating mechanism comprising rotating contacting scissor acting blades.

In testimony whereof I have hereunto subscribed my name in the presence of two subscribing witnesses.

JAY M. JOHNSON.

Witnesses:
CHARLES W. HILLS, Jr.,
FRANK K. HUDSON.